United States Patent [19]
Takamura

[11] 3,861,651
[45] Jan. 21, 1975

[54] DEVICE FOR HAULING DRAGNET

[76] Inventor: Daigo Takamura, 73 Onahamakamikajiro tateshita, Iwaki, Japan

[22] Filed: Oct. 10, 1972

[21] Appl. No.: 296,081

[52] U.S. Cl............................ 254/137, 37/69, 43/8, 226/186, 226/191, 254/175.5
[51] Int. Cl............................................ A01k 73/06
[58] Field of Search..... 254/137, 138, 190 R, 175.5, 254/175.7; 43/8, 14; 226/181, 186, 187, 188, 226/191; 37/69

[56] References Cited
UNITED STATES PATENTS

| 1,232,535 | 7/1917 | Hagset | 254/137 |
|---|---|---|---|
| 2,628,506 | 2/1953 | Beck et al. | 254/137 X |
| 2,645,455 | 7/1953 | Rowe | 254/137 |
| 2,810,979 | 10/1957 | Puretic | 43/8 |
| 2,948,513 | 8/1960 | Krohn-Holm | 254/190 R |
| 3,069,799 | 12/1962 | Puretic | 43/8 |
| 3,297,303 | 1/1967 | Aizawa | 254/138 |
| 3,535,811 | 10/1970 | Demmert | 43/8 |

FOREIGN PATENTS OR APPLICATIONS

| 744,911 | 10/1966 | Canada | 43/8 |

*Primary Examiner*—Evon C. Blunk
*Assistant Examiner*—James L. Rowland
*Attorney, Agent, or Firm*—Fleit & Jacobson

[57] ABSTRACT

A device for hauling a dragnet, comprising a pair of ball rotors having elastic surfaces mutually depressed and through which a dragrope is hauled, the dragrope being connected with a dragnet.

6 Claims, 5 Drawing Figures

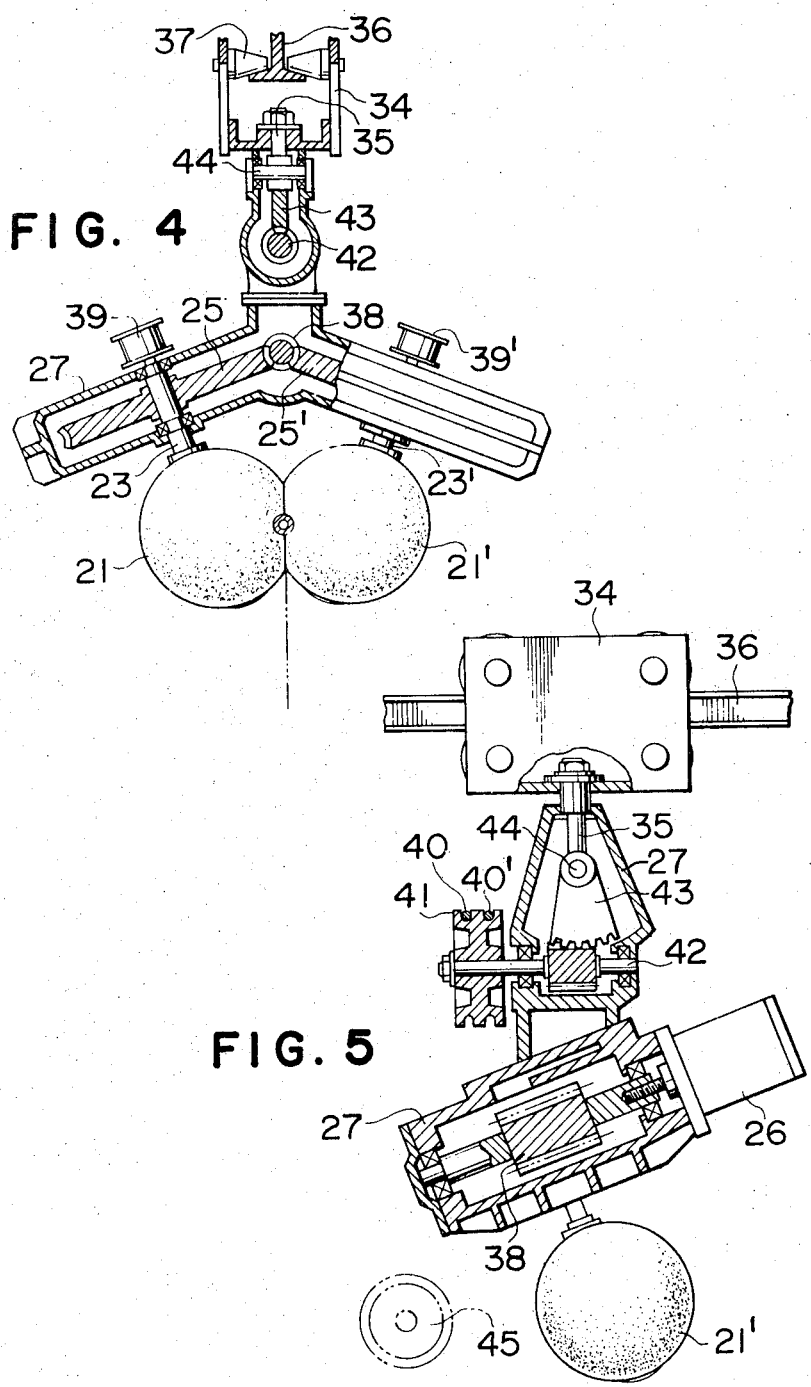

DEVICE FOR HAULING DRAGNET

The present invention relates to a device for hauling a dragnet, and more particularly to a mechanically operated net hauler.

An object of this invention is to provide a device for hauling a dragnet, comprising a pair of hollow pinching ball rotors through which a dragrope is hauled, with the dragnet being pulled under said rotors.

According to the invention, the pinching ball rotors are defined by elastic layers surrounding or forming spherical surfaces depressed to each other and driven in opposite directions to each other.

The other features of this invention will be understood from the following description with reference to the accompanying drawings, in which:

FIG. 4 is a cross-sectional front view of the net hauler of FIG. 3; and

FIG. 5 is a cross-sectional side view of said hauler of FIG. 3.

Figure 1:
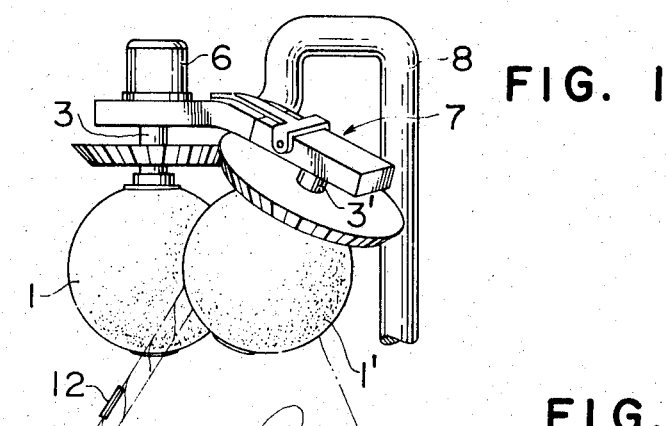
FIG. 1 is a perspective view of an improved net hauler embodying the present invention.
Figure 2:
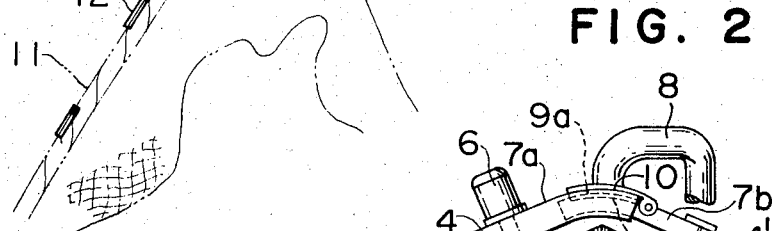
FIG. 2 is a cross-sectional front view of the net hauler of FIG. 1.

Refering to FIGS. 1 and 2, the net hauler of the present invention comprises a pair of hollow ball rotors 1 and 1' having elastic layers 2 and 2', for example, rubber layers which form spherical surfaces of the rotors. The ball rotors 1 and 1' are fixedly attached to driving shafts 3 and 3', which are journaled to bearing members 4 and 4' and extend downwards.

To the driving shafts 3 and 3' are secured bevel gears 5 and 5' intermeshed with each other. One of the shafts is driven by power developed by an electric motor 6 so as to cause the ball rotors 1 and 1' to be rotated in opposite directions. Both the shafts 3 and 3' are suspended on a housing 7 integrally formed with the top of a supporting pole member 8, which is fixedly secured to a deck frame.

Preferably, the housing 7 consists of two pieces, 7a and 7b, one of which is provided with the bearing member 4, and the other with the bearing member 4'. Piece 7a has a hollow cylindrical portion into which is slidably inserted a rounded portion formed at one end of the other piece 7b. The cylindrical portion and rounded portion have slits 9a and 9b, respectively, in which is sunk a common key 10 having an arm pivoted to the piece 7b.

In operation, when the motor is energized, a dragrope 11 such as a floating rope or sinking rope is pinched between the elastic spherical surfaces of the rotors in flexible contact with each other. The dragrope 11 is progressively introduced between the rotors so that the dragrope body, together with a plurality of float members 12 specially attached thereto, is hauled by being pulled through the elastic surfaces as is shown in FIG. 2. The hollow spherical surfaces are compressed even more when the float members 12 pass therebetween. Simultaneously, a dragnet trailing along the dragrope passes under the ball rotors and is collected on the deck.

By use of the net hauler of this invention, the dragnet can be hauled in without danger of being entangled in the hauling members since the dragrope is guided through the region between the elastic spherical surfaces of the rotors.

Figure 3:
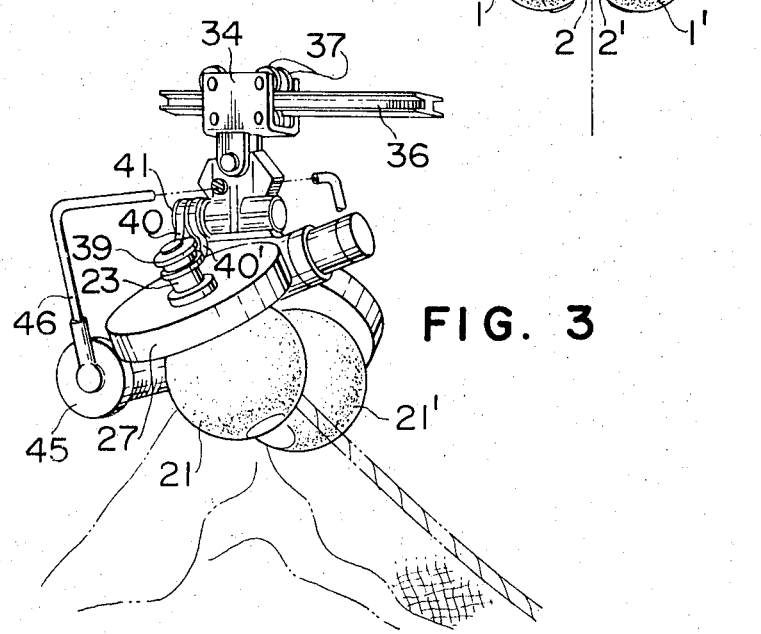
FIG. 3 is a perspective view of another embodiment of this invention.

FIGS. 3 to 5 indicate an embodiment of this invention modified from that of FIGS. 1 and 2. In this second embodiment, rotor shafts 23 and 23' to which are attached hollow ball rotors 21 and 21' are journaled to a hollow housing 27, the central portion of which is suspended on a carrier 34 by means of a vertical journal joint 35. The carrier can travel along a horizontal rail 36, being equipped with carrier wheels 37 and associating with suitable pulling means (not shown).

To the shafts 23 and 23' are attached worm-wheels 25 and 25' contained in the interior of the housing 27 and intermeshed with a worm shaft 38 extending through said housing 27 and connected with the power take-off shaft of an electric motor 26, the casing of which is secured to the outer wall of the housing 27.

In this embodiment, pulleys 39 and 39' are rotatably fitted on the shafts 23 and 23', and endless belts 40 and 40' are stretched between the pulleys 39 and 39'. A two-stage pulley 41 is attached to a worm shaft 42 which is contained in and journaled to the central portion of the housing 27. The worm shaft 42 is intermeshed with a worm wheel 43 attached to a pivot pin 44 fixed to the journal joint 35. The housing 27 is rotatably supported on the pivot pin 44.

Furthermore, the net hauler of this embodiment preferably includes a cylindrical auxiliary roller 45 disposed on the front side position of the ball rotors for guiding the dragrope to the determined portions of the elastic layers 22 and 22' contacting each other by elastic depression. The auxiliary roller 45 is also journaled to a hanging member 46 pivoted to the housing 27.

In operation, when the motor 26 is driven, the shafts 23 and 23' are rotated in the opposite direction to each other through the action of the worm and worm wheels so as to cause the dragrope to be pinched between and hauled through the eleastic contact surfaces of the ball rotors. In this manner, the dragnet is pulled under the ball rotors without the dragnet being entangled in the hauling members, and is conveniently accumulated on the deck.

The net hauler of this invention is useful for gathering the submarine mines as well as for fishing.

What is claimed is:

1. A device for hauling a dragnet, and comprising a pair of ball rotors having elastic surfaces for contacting and holding therebetween a dragrope which mutually depresses said elastic surfaces in the respective ball rotors thereby developing forces in said ball rotors urging said dragrope to be held therebetween so that a dragnet trailing along said dragrope is by gravity pulled under said ball rotors; a pair of generally vertical shafts to which said rotors are fixed; a housing for supporting the upper portions of said shafts in such a manner as to be free from the lower portions of said ball rotors; and a motor for driving said shafts in opposite directions to each other.

2. A device for hauling a dragnet claimed in claim 1 in which the housing is suspended on a carrier traveling along a rail extending in a horizontal direction.

3. A device for hauling a dragnet claimed in claim 1 in which there is further provided an auxiliary roller disposed on the front side portion of the ball rotors for guiding the dragrope to predetermined portions of the elastic layers formed on the spherical surfaces of the rotors.

4. A device for hauling a dragnet claimed in claim 1 wherein said ball rotors are generally hollow balls.

5. A device for hauling a dragnet, and comprising a pair of ball rotors having elastic surfaces for contacting and holding therebetween a dragrope which mutually depresses said elastic surfaces in the respective ball rotors thereby developing forces in said ball rotors urging said dragrope to be held therebetween so that a dragnet trailing along said dragrope is by gravity pulled under said ball rotors; a pair of generally vertical shafts to which said rotors are fixed; a housing for supporting the upper portions of said shafts in such a manner as to be free from the lower portions of said ball rotors; bevel gears attached to the respective shafts and intermeshed with each other; and a motor for driving said shafts in opposite directions to each other.

6. A device for hauling a dragnet, and comprising a pair of ball rotors having elastic surfaces for contacting and holding therebetween a dragrope which mutually depresses said elastic surfaces in the respective ball rotors thereby developing forces in said ball rotors urging said dragrope to be held therebetween so that a dragnet trailing along said dragrope is by gravity pulled under said ball rotors; a pair of generally vertical shafts to which said rotors are fixed; worm wheels attached to the respective shafts and intermeshed with a common worm shaft; and a motor for driving the worm shafts so as to cause the shafts of the rotors to be rotated in opposite directions to each other; said worm wheels being attached to the upper portions of said shafts in such a manner as to be free from the lower portions of said ball rotors.

* * * * *